United States Patent
Miyazaki et al.

(10) Patent No.: US 7,107,867 B2
(45) Date of Patent: Sep. 19, 2006

(54) AUTOMATIC TRANSMISSION

(75) Inventors: Terufumi Miyazaki, Toyota (JP); Masafumi Kinoshita, Toyota (JP); Yuji Yasuda, Nishikamo-gun (JP); Hirofumi Onishi, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 94 days.

(21) Appl. No.: 10/831,140

(22) Filed: Apr. 26, 2004

(65) Prior Publication Data

US 2004/0231457 A1 Nov. 25, 2004

(30) Foreign Application Priority Data

May 22, 2003 (JP) .............................. 2003-145052

(51) Int. Cl.
*F16H 3/08* (2006.01)
(52) U.S. Cl. ...................................... 74/333; 74/606 R
(58) Field of Classification Search ................ 475/290, 475/286; 192/85 AA, 87.11; 74/606 R, 74/333
See application file for complete search history.

(56) References Cited

U.S. PATENT DOCUMENTS

| | | | | |
|---|---|---|---|---|
| 4,351,203 A | * | 9/1982 | Fukunaga | ................. 74/606 R |
| 4,794,942 A | * | 1/1989 | Yasuda et al. | ............... 137/197 |
| 4,994,006 A | * | 2/1991 | Kinoshita et al. | ........... 475/286 |
| 6,206,161 B1 | * | 3/2001 | Ross | ....................... 192/48.91 |
| 2004/0231457 A1 | | 11/2004 | Miyazaki et al. | |
| 2006/0101942 A1 | * | 5/2006 | Onishi et al. | .............. 74/665 R |

FOREIGN PATENT DOCUMENTS

JP    2000-257702    9/2000

\* cited by examiner

*Primary Examiner*—Rodney H. Bonck
*Assistant Examiner*—Justin K. Holmes
(74) *Attorney, Agent, or Firm*—Oblon, Spivak, McClelland, Maier & Neustadt, P.C.

(57) ABSTRACT

An automatic transmission includes a parallel-axis gear pair including a first gear having a shaft portion and a gear portion, and a second gear which meshes with the first gear; a case that has a supporting wall which is adjacent to the gear portion of the first gear and rotatably supports the shaft portion of the first gear; and a frictional engagement apparatus that includes friction members, a piston that presses on, so as to apply, the friction members, and a hydraulic chamber that holds hydraulic fluid which moves the piston in the direction of the friction members. As a result, both the shaft to shaft dimension as well as the axial dimension of the automatic transmission can be reduced.

6 Claims, 4 Drawing Sheets

AUTOMATIC TRANSMISSION

INCORPORATION BY REFERENCE

The disclosure of Japanese Patent Application No. 2003-145052 filed on May 22, 2003, including the specification, drawings and abstract is incorporated herein by reference in its entirety.

BACKGROUND OF THE INVENTION

1. Field of the Invention

The invention relates to an automatic transmission, and more particularly, an automatic transmission provided with a parallel-axis gear pair.

2. Description of the Related Art

An automatic transmission provided with a parallel-axis gear pair has been known. For example, there is an automatic transmission provided with a plurality of planetary gear sets, which has a countershaft provided parallel with an input shaft, and a parallel-axis gear pair for transmitting the rotation of the input shaft to the countershaft. One example of this kind of automatic transmission is disclosed in a non-patent reference, "Manual for the New Model Harrier", published by Toyota Motor Corporation on Dec. 25, 1997. FIG. 4 shows a cross-section of a portion of the automatic transmission described on pages 2-2 to 2-8 of that reference.

As shown in FIG. 4, a counter drive gear 100 is able to rotate around a second input shaft 104 that rotates together with a first input shaft 102 that is coupled to a torque converter, not shown. A counter driven gear 106 is able to rotate around a countershaft 108.

The counter drive gear 100 includes a shaft portion 110 and a gear portion 112, which is perpendicular to the shaft portion 110 and provided on one end of the shaft portion 110. The shaft portion 110 is supported by a supporting wall 118 of a case 116 via a bearing 114.

Also, an outside peripheral portion 112a of the gear portion 112 of the counter drive gear 100 is wider than an inner peripheral portion 112b of the gear portion 112. Further, the center of the outer peripheral portion 112a in the axial direction is closer to the supporting wall 118 side than is the center of the inner peripheral portion 112b in the axial direction, such that the outer peripheral portion 112a protrudes farther toward the supporting wall 118 than does the inner peripheral portion 112b. A concave portion 120 that accommodates the outer peripheral portion 112a of the counter drive gear 100 is formed in the supporting wall 118.

Further, a clutch 130 is provided on the side of the counter drive gear 100 opposite the supporting wall 118. The clutch 130 includes a plurality of friction plates 122, a piston 124 that presses on the plurality of friction plates 122, a spring 126 that urges the piston 124 away from the friction plates 122, and a hydraulic chamber 128 and the like. When the plurality of friction plates 122 are forced together, an intermediate shaft 132 which encompasses the second input shaft 104 and is coupled to a sun gear of a planetary gear set, not shown, becomes coupled to the first input shaft 102.

Accordingly, by forming the concave portion 120 in the supporting wall 118 and accommodating the outer peripheral portion 112a of the gear portion 112 of the counter drive gear 100 in this concave portion 120, the automatic transmission shown in FIG. 4 can be made shorter in the axial direction.

Not only is it necessary to make the dimensions of the automatic transmission shorter in the axial direction, but there is also a need to reduce the shaft to shaft dimension of the automatic transmission, i.e., the dimension of the automatic transmission in the direction perpendicular to the axis. In order to decrease the shaft to shaft dimension of the automatic transmission shown in FIG. 4, it is conceivable to reduce the diameter of the gear portion 112 of the counter drive gear 100. With this structure, however, the concave portion 120 of the supporting wall 118 is prevented from being moved much to the inside in the radial direction by the bearing 114, so unless position of the concave portion 120 is changed, the diameter of the gear 112 of the counter drive gear 100 can not be reduced. While the diameter of the gear portion 112 could be reduced if the counter drive gear 100 were moved toward the first input shaft 102 side, doing so would simply increase the length of the automatic transmission in the axial direction.

SUMMARY OF THE INVENTION

In view of the foregoing problems, the invention thus provides an automatic transmission of which both the shaft to shaft dimension as well as the axial dimension can be reduced.

A first aspect of the invention relates to an automatic transmission provided with a parallel-axis gear pair, a case, and a frictional engagement apparatus. The parallel-axis gear pair includes a first gear having a shaft portion and a gear portion, and a second gear which meshes with the first gear. The case has a supporting wall that is adjacent to the gear portion of the first gear and rotatably supports the shaft portion of the first gear. The frictional engagement apparatus includes friction members, a piston that presses on, so as to apply, the friction members, and a hydraulic chamber that holds hydraulic fluid which moves the piston in the direction of the friction members. A concave portion is formed in a side face of the supporting wall opposite the gear portion of the first gear. The piston includes a cylinder portion and a bottom portion. The cylinder portion is disposed to the outside, in the radial direction, of the gear portion of the first gear. A section of the cylinder portion substantially corresponding to a location where the parallel-axis gear pair mesh is cut out. The bottom portion is accommodated in the concave portion of the supporting wall. The hydraulic chamber is formed between the bottom portion of the piston and the concave portion of the supporting wall. The friction members are located on the side of the gear portion of the first gear that is opposite the side of the gear portion of the first gear on which the bottom portion of the piston is arranged.

In the automatic transmission described above, the concave portion is formed in the supporting portion of the case, and this concave portion accommodates the bottom portion of the piston, as well as the hydraulic chamber that holds hydraulic fluid which moves the bottom portion of the piston. As a result, narrow space is able to be used efficiently, thus enabling the dimension of the automatic transmission in the axial direction to be made shorter. Further, since the gear portion of the first gear is not accommodated in the concave portion formed in the supporting wall, the fact that the position of the concave portion is restricted is no longer of any consequence to the diameter of the gear, so the diameter of the gear portion of the first gear can be reduced. As a result, the shaft to shaft dimension of the automatic transmission can also be reduced.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF THE PREFERRED EMBODIMENTS

Figure 1:
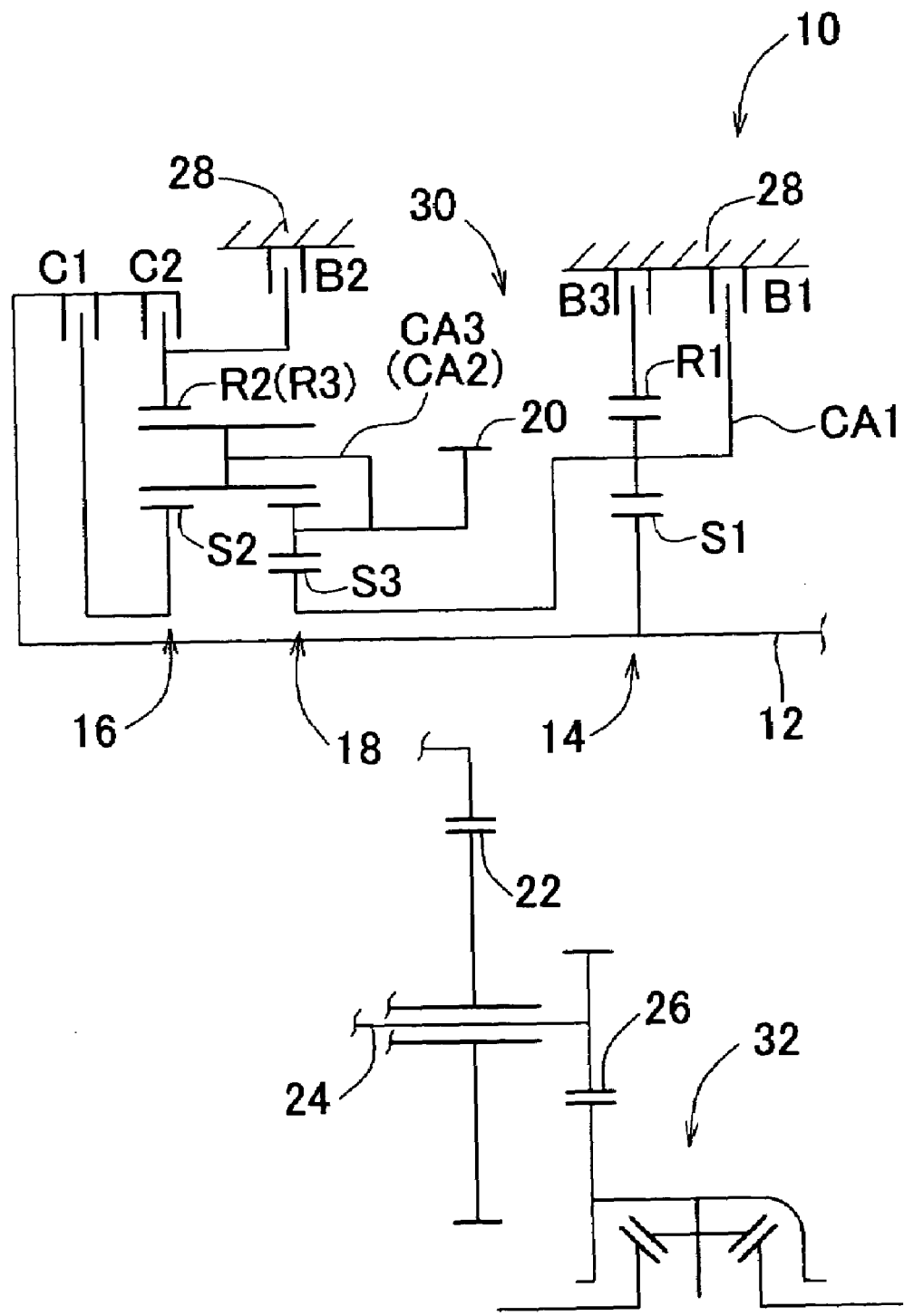
FIG. 1 is a skeleton view of an automatic transmission for a vehicle, according to one exemplary embodiment of the invention.

In the following description and the accompanying drawings, the present invention will be described in more detail in terms of exemplary embodiments. FIG. 1 is a skeleton view of an automatic transmission 10 for a vehicle, according to one exemplary embodiment of the invention.

The automatic transmission 10 includes an input shaft 12, a first planetary gear set 14, a second planetary gear set 16, a third planetary gear set 18, a counter drive gear 20 which serves as the first gear, a counter driven gear 22 which serves as the second gear, a countershaft 24, an output gear 26, clutches C1 and C2, and brakes B1, B2, and B3, and the like. The planetary gear sets 14, 16, and 18, counter drive gear 20, clutches C1 and C2, and brakes B1, B2, and B3 are substantially symmetrical with respect to the input shaft 12. Therefore, most of the lower halves of those symmetrical members below the input shaft 12 are not shown in FIG. 1.

Each of the planetary gear sets 14, 16, and 18 include, as elements, a sun gear S1, S2, and S3, a ring gear R1, R2, and R3, and a carrier CA1, CA2, and CA3, respectively. The clutches C1 and C2 and brakes B1, B2, and B3 enable these elements to be selectively coupled either together or to a case 28.

The intake shaft 12 and the countershaft 24 are arranged parallel to one another. The counter drive gear 20 that rotates around the intake shaft 12, together with the counter driven gear 22 which is in constant mesh with the counter drive gear 20 and rotates around the countershaft 24, constitute a parallel-axis gear pair 30. The output gear 26 is fixed to one end of the countershaft 24 and meshed with a differential gear unit 32.

Figure 2:
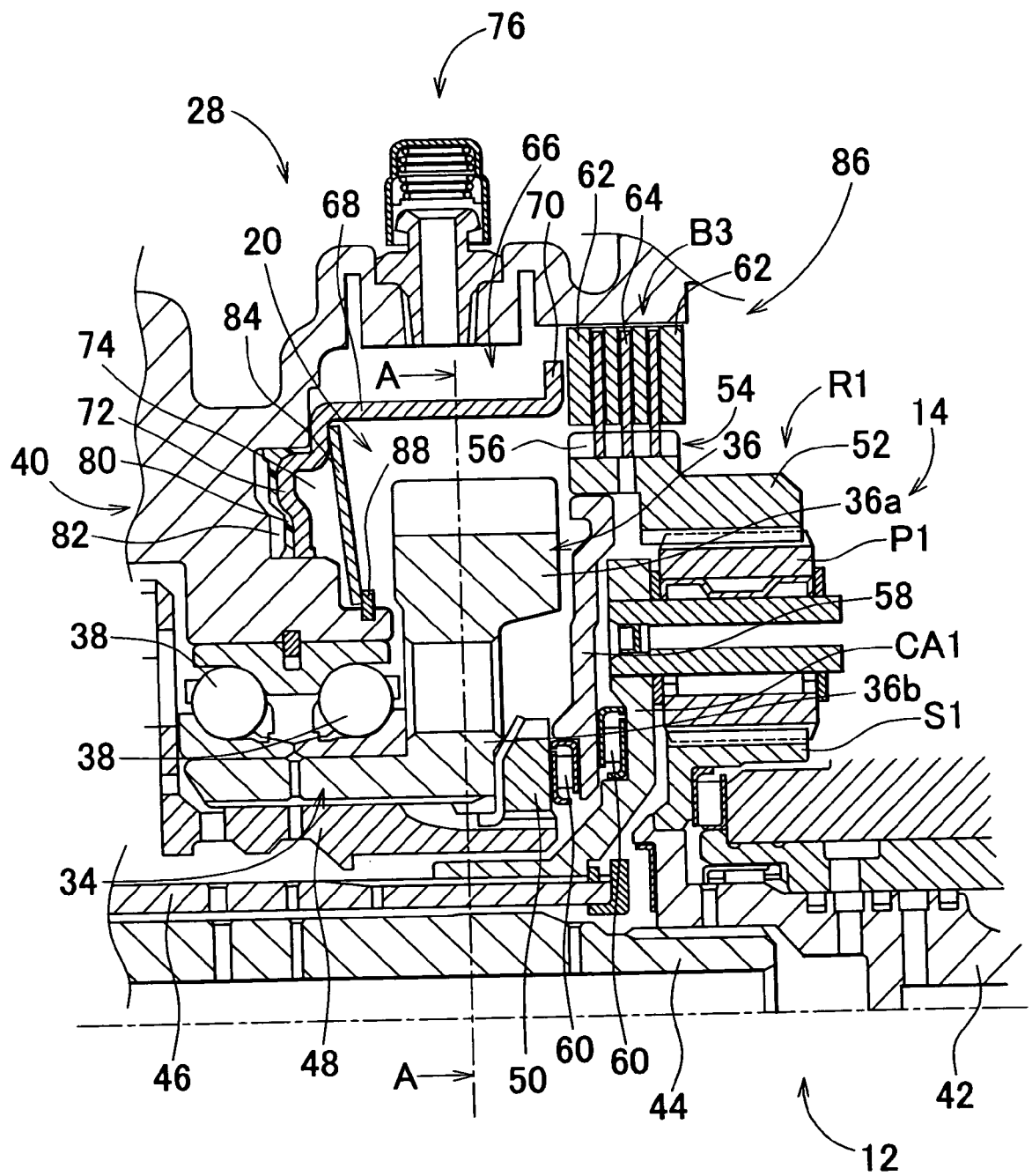
FIG. 2 is a cross-sectional view of a portion of the automatic transmission for a vehicle shown in FIG. 1.

FIG. 2 is a cross-sectional view of a portion of the automatic transmission 10. The counter drive gear 20 includes a cylindrical shaft portion 34 and a gear portion 36 which is provided at one end of the shaft portion 34 in the axial direction and protrudes substantially perpendicular with respect to the shaft portion 34. A supporting wall 40, which protrudes toward the shaft portion 34 at a location adjacent to the gear portion 36, is formed on the case 28. The shaft portion 34 is rotatably supported by the supporting wall 40 via a bearing 38 provided around the outside of the shaft portion 34.

The input shaft 12 includes a first input shaft 42, which is coupled to a torque converter (not shown), and a second input shaft 44 that is spline-fitted to the first input shaft 42. A first intermediate shaft 46 encompasses the second input shaft 44 and is rotatable relative thereto. Further, the carrier CA1 of the first planetary gear set 14 is spline-fitted to the outer periphery of the first intermediate shaft 46.

The outer peripheral portion 36a of the gear portion 36 of the counter drive gear 20 is wider than the inner peripheral portion 36b thereof. The center of the outer peripheral portion 36a in the axial direction is also closer to the side opposite the supporting wall 40 than the center of the inner peripheral portion 36b in the axial direction. In other words, the outer peripheral portion 36a protrudes, with respect to the inner peripheral portion 36b, toward the side opposite the supporting wall 40. Also, the side face on the supporting wall 40 side of the outer peripheral portion 36a substantially matches a side face of an outermost protruding portion of the supporting wall 40, which protrudes in the axial direction toward the outer peripheral portion 36a.

A second intermediate shaft 48, which is coupled to the carrier CA3 (not shown in FIG. 2) of the third planetary gear set 18, is spline-fitted to an inner peripheral surface of the shaft portion 34. A nut 50 is fastened onto the end of the second intermediate shaft 48 on the first planetary gear set 14 side to prevent the counter drive gear 20 from moving in the direction of the first planetary gear set 14.

The sun gear S1 of the first planetary gear set 14 is fixed by welding to the end portion of the first input shaft 42 and thus rotates integrally with the first input shaft 42. The ring gear R1 has a gear portion 52 that has teeth along its inner periphery, and a drum portion 54 that has a somewhat larger diameter than the gear portion 52. This drum portion 54 is coupled with the gear portion 52 at an end portion on the counter drive gear 20 side in the axial direction. A spline portion 56 is formed on the outer peripheral surface of the drum portion 54. In addition, an outer peripheral end of a disc-shaped restriction plate 58 that restricts the ring gear R1 from moving in the axial direction is fixed to the inner peripheral surface of the drum portion 54. A bearing 60 is interposed between one side face of the inner peripheral portion of the restriction plate 58 and the carrier CA1, as well as between the other side face of the inner peripheral portion of the restriction plate 58 and the nut 50.

The brake B3 includes multiple inward-facing friction plates 62 and multiple outward-facing friction plates 64. The inward-facing friction plates 62 are spline-fitted to the inner periphery side of the case 28, and thus prevented from rotating relative to the case 28. The outward-facing friction plates 64 are interposed alternately between the inward-facing friction plates 62 and fitted to the spline portion 56 of the drum portion 54 of the ring gear RI. These inward-facing friction plates 62 and multiple outward-facing friction plates 64 correspond to the friction members.

A piston 66 includes a cylinder portion 68 located to the outside, in the radial direction, of the gear portion 36 of the counter drive gear 20, a flange portion 70 formed on one end of the cylinder portion 68 on the friction plate 62 and 64 side, and a bottom portion 72 formed at the other end of the cylinder portion 68. The flange portion 70 protrudes substantially perpendicular and outward in the radial direction with respect to the cylinder 68. The bottom portion 72 is ring-shaped and protrudes substantially perpendicular and inward in the radial direction with respect to the cylinder 68. The bottom portion 72 is accommodated by a concave portion 74 formed in the side face on the counter drive gear 20 side of the supporting wall 40. Also, a breather plug 76 for adjusting the pressure within the automatic transmission 10 is fitted into the case 28 radially outward from the cylinder portion 68.

Figure 3:
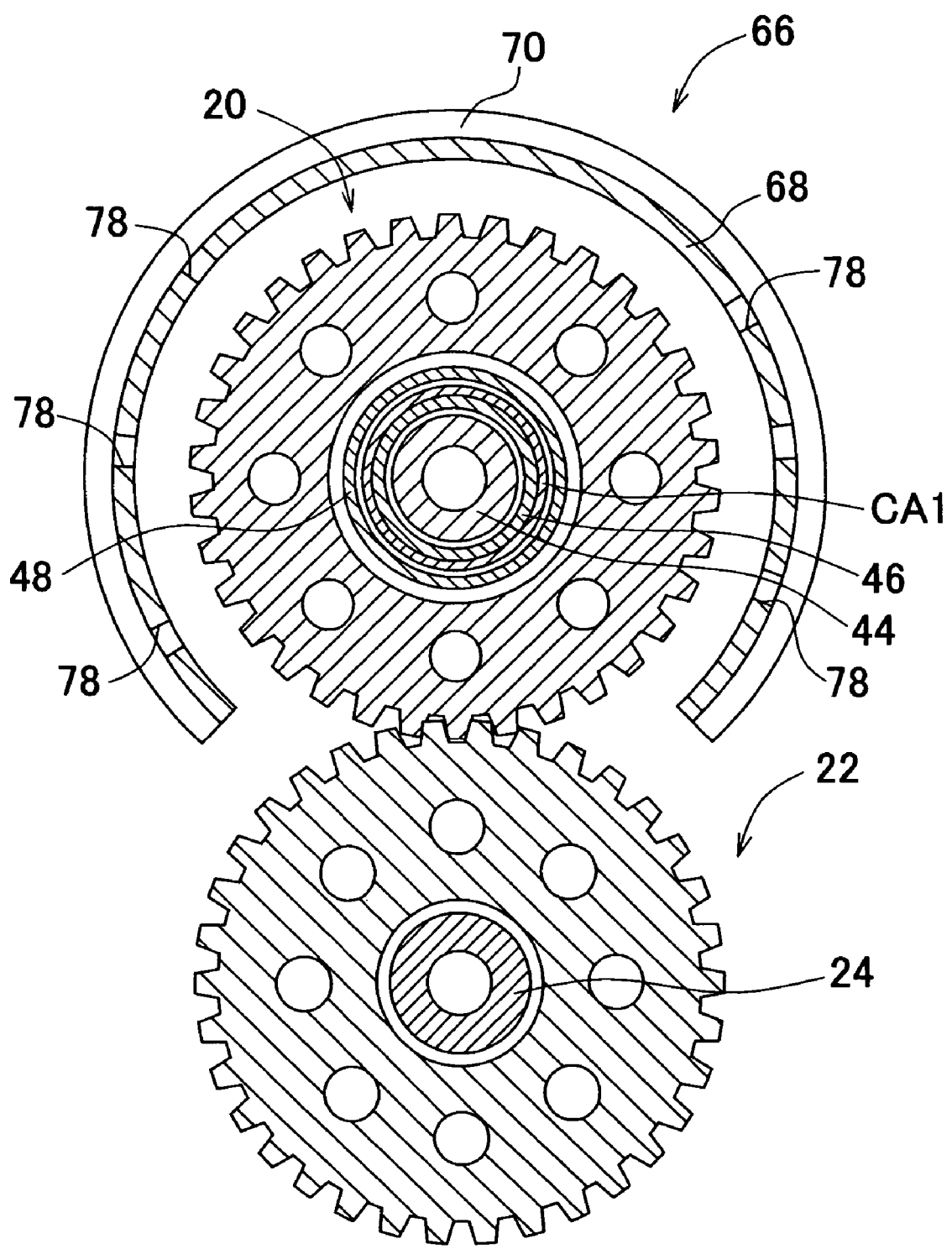
FIG. 3 is a schematic view of a cross-section of the portion of the automatic transmission for a vehicle shown in FIG. 2 taken along line A—A.
Figure 4:
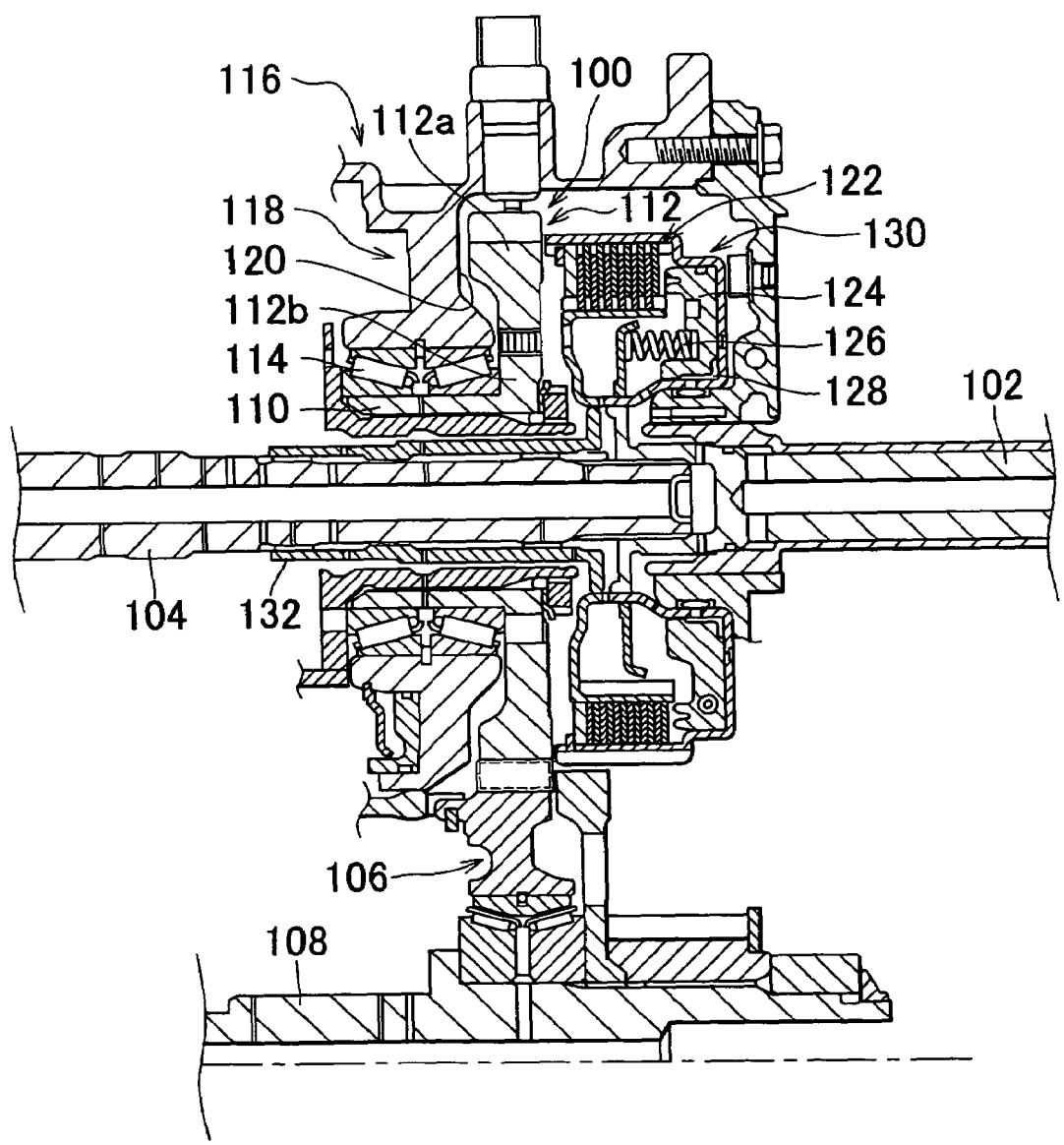
FIG. 4 is a cross-sectional view showing a portion of a related-art automatic transmission.

FIG. 3 is a schematic view of a cross-section of the automatic transmission shown in FIG. 2 taken along line A—A. As shown in FIG. 3, the cylinder portion 68 and flange portion 70 of the piston 66 are designed to cover a large portion of the counter drive gear 20. A section of these portions substantially corresponding to a location where the counter drive gear 20 and the counter driven gear 22 mesh has been cut out. Also, a plurality of oil holes 78 are formed in the cylinder portion 68 at a portion that does not face the breather plug 76, not shown in FIG. 3, to expel lubricant in the radial direction. Although these oil holes 78 are provided in this exemplary embodiment, it is not absolutely necessary that they be provided.

Referring back to FIG. 2, a rubber member 80 for sealing the area between both ends, in the radial direction, of the bottom portion 72 and the supporting wall 40 is attached to the face of the bottom portion 72 that is opposite the supporting wall 40. A hydraulic chamber 82 is formed between the concave portion 74 and the rubber member 80. Further, a plate spring 84 for urging the bottom portion 72 of the piston 66 toward the hydraulic chamber 82 is housed in the concave portion 74 on the open side (the right side in FIG. 2) of the bottom portion 72 of the piston 66. The outer peripheral edge of the plate spring 84 abuts against the outer peripheral portion of the bottom portion 72 of the piston 66. The inner peripheral edge of the plate spring 84 abuts against a snap spring 88 that is fitted in the supporting wall 40 to prevent the plate spring 84 from moving toward the counter drive gear 20 side.

The friction plates 62 and 64 (i.e., the brake B3), the piston 66, the hydraulic chamber 82, and the plate spring 84 together serve as a friction engagement apparatus 86. This friction engagement apparatus 86 couples or releases the ring gear R1 of the first planetary gear set 14 to or from the case 28. More specifically, when hydraulic fluid is supplied to the hydraulic chamber 82, the piston 66 is moved against the spring force of the plate spring 84 and engages the inward-facing friction plates 62 with the outward-facing friction plates 64, such that the ring gear R1 becomes integrally coupled to the case 28. Conversely, when the hydraulic fluid is discharged from the hydraulic chamber 82, the piston 66 is forced back by the spring force of the plate spring 84. As a result, the inward-facing friction plates 62 and the outward-facing friction plates 64 disengage, such that the ring gear R1 is no longer integrally coupled to the case 28.

According to the exemplary embodiment described above, the concave portion 74 is formed in the supporting wall 40 of the case 28, and this concave portion 74 accommodates the bottom portion 72 of the piston 66, as well as the hydraulic chamber 82 that holds hydraulic fluid which moves the bottom portion 72 of the piston 66. As a result, narrow space is able to be used efficiently, thus enabling the dimension of the automatic transmission in the axial direction to be made shorter. Further, since the gear portion 36 of the counter drive gear 20 is not accommodated in the concave portion 74 formed in the supporting wall 40, the fact that the position of the concave portion 74 is restricted is no longer of any consequence to the diameter of the gear, so the diameter of the gear portion 36 of the counter drive gear 20 can be reduced. As a result, the shaft to shaft dimension of the automatic transmission 10 can also be reduced.

According to the foregoing exemplary embodiment, providing the breather plug 76 radially outward from the cylinder portion 68 of the piston 66 obviates the need to provide a special part to prevent the lubricant from getting into the breather plug 76.

Although the invention has been described herein with reference to specific embodiments, many modifications and variations therein will readily occur to those skilled in the art. Accordingly, all such variations and modifications are included within the intended scope of the invention.

For example, the friction engagement apparatus 68 in the foregoing exemplary embodiment includes a brake, but it may include a clutch instead.

Further, in the foregoing exemplary embodiment, the plate spring 84 is housed in the concave portion 74 of the supporting wall 40, but it need not be. For example, the plate spring 84 may be disposed on the outer peripheral side of the piston 66, or on the side of the friction members, in order to press on the flange portion 70 of the piston 66. Moreover, a coil spring may be used instead of the plate spring 84.

Also, the parallel-axis gear pair in the foregoing exemplary embodiment includes the counter drive gear 20 and the counter driven gear 22, i.e., a parallel-axis gear pair in which the input shaft 12 and the counter shaft 24 are parallel shafts. The parallel shafts are not limited to this combination, however. For example, the parallel shafts may be the countershaft and the output shaft or the input shaft and the output shaft.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An automatic transmission comprising:
   a parallel-axis gear pair including a first gear having a shaft portion and a gear portion, and a second gear which meshes with the first gear;
   a case that has a supporting wall which is adjacent to the gear portion of the first gear and rotatably supports the shaft portion of the first gear; and
   a frictional engagement apparatus that includes friction members, a piston that presses on, so as to apply, the friction members, and a hydraulic chamber that holds hydraulic fluid which moves the piston in the direction of the friction members,
   wherein a concave portion is formed in a side face of the supporting wall opposite the gear portion of the first gear;
   the piston includes a cylinder portion which is disposed to the outside, in the radial direction, of the gear portion of the first gear and of which a section of the cylinder portion, corresponding to a location where the parallel-axis gear pair mesh, has been cut out, and a bottom portion which is accommodated in the concave portion of the supporting wall;
   the hydraulic chamber is formed between the bottom portion of the piston and the concave portion of the supporting wall; and
   the friction members are located on the side of the gear portion of the first gear that is opposite the side of the gear portion of the first gear on which the bottom portion of the piston is arranged.

2. The automatic transmission according to claim 1, further comprising:
   a breather plug provided to the outside, in the radial direction, of the cylinder portion of the piston.

3. The automatic transmission according to claim 2, wherein the width of an outer peripheral portion of the gear portion of the first gear is wider than the width of an inner peripheral portion of the gear portion of the first gear, and a center, in the axial direction, of the outer peripheral portion is farther away from the supporting wall than a center, in the axial direction, of the inner peripheral portion.

4. The automatic transmission according to claim 3, wherein a side face of the outer peripheral portion on the supporting wall side substantially matches a side face of an outermost protruding portion of the supporting wall, which protrudes in the axial direction toward the outer peripheral portion.

5. The automatic transmission according to claim 1, wherein the width of an outer peripheral portion of the gear portion of the first gear is wider than the width of an inner peripheral portion of the gear portion of the first gear, and a center, in the axial direction, of the outer peripheral portion is farther away from the supporting wall than a center, in the axial direction, of the inner peripheral portion.

6. The automatic transmission according to claim 5, wherein a side face of the outer peripheral portion on the supporting wall side substantially matches a side face of an outermost protruding portion of the supporting wall, which protrudes in the axial direction toward the outer peripheral portion.

\* \* \* \* \*